Nov. 9, 1954   B. P. COOPER ET AL   2,693,740
APPARATUS FOR MAKING SHOE STIFFENERS
Filed Nov. 22, 1949   4 Sheets-Sheet 1

Inventors
Basil P. Cooper
Kenneth J. B. Clark
Arthur Bradshaw
By their Attorney

Nov. 9, 1954  B. P. COOPER ET AL  2,693,740
APPARATUS FOR MAKING SHOE STIFFENERS
Filed Nov. 22, 1949  4 Sheets-Sheet 2

Inventors:
Basil P. Cooper
Kenneth J. B. Clark
Arthur Bradshaw
By their Attorney

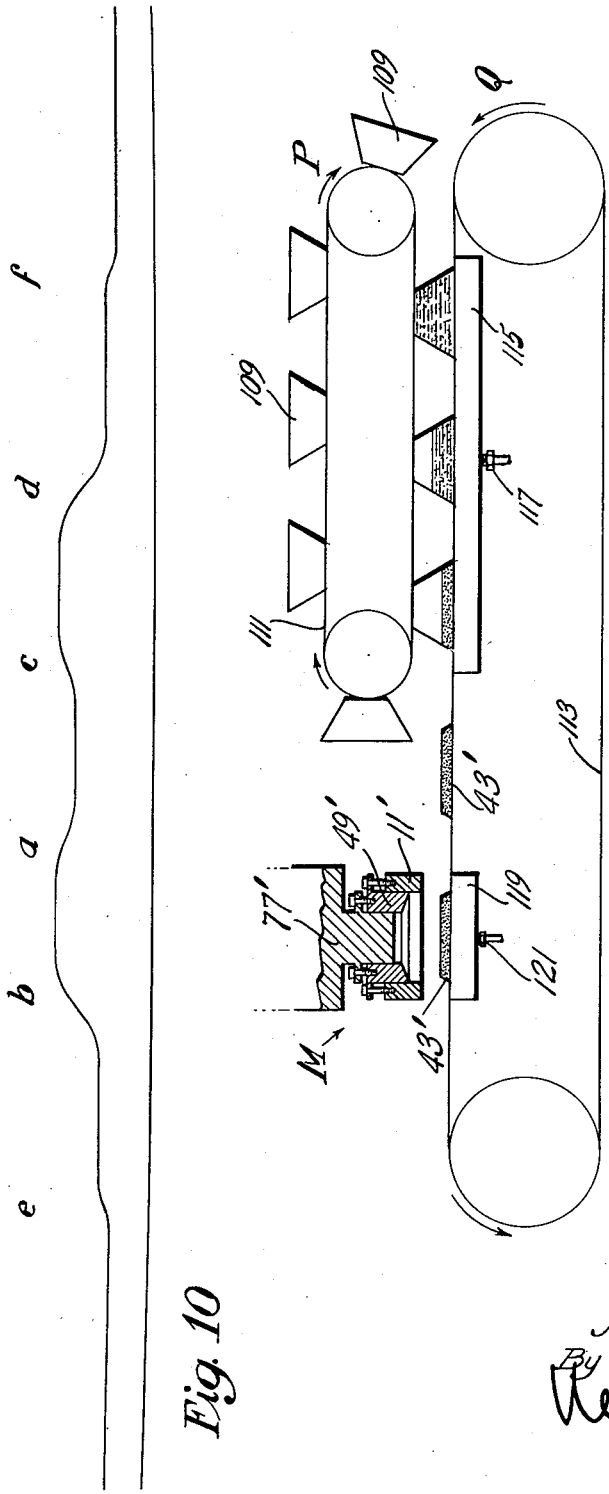

United States Patent Office 2,693,740
Patented Nov. 9, 1954

2,693,740

APPARATUS FOR MAKING SHOE STIFFENERS

Basil Pomeroy Cooper, Kenneth John Benjamin Clark, and Arthur Bradshaw, Leicester, England, assignors to United Shoe Machinery Corporation, Flemington, N. J., a corporation of New Jersey Application November 22, 1949, Serial No. 128,726

Claims priority, application Great Britain December 2, 1948

2 Claims. (Cl. 92—54)

This invention is concerned with improvements in or relating to apparatus for making members for stiffening of shoes and is hereinafter described by way of illustration with reference to apparatus for making stiffening members suitable for use in stiffening heel end portions of shoes (i. e. stiffening members usually referred to as counters) but it is to be appreciated that the apparatus of the invention is applicable to forming other shoe stiffening members, e. g. shank stiffening members.

The word "shoe" is used herein generically to denote outer footwear generally.

In manufacturing counters at the present time it is customary to proceed in the following way: laminae of uniform thickness and of an appropriate shape are died out from sheets of fibre board and skived to provide a blank having a tapering marginal portion bordering a central portion of uniform thickness; next the blanks are passed between crimping rolls to crimp those parts thereof which will lie upon the heelseat in the finished shoes; next the blanks are passed between heated rollers which apply a thin film of wax thereto; next the waxed blanks are passed between rolls which impart a small curvature thereto both longitudinally and transversely; and finally the blanks are moulded into a shape in conformity with that of the outer surface of the heel end portion of a last by use of a counter moulding machine of the Stewart type, for example a machine as described in United States Patent No. 1,742,300 to Leslie H. Bennion, issued January 7, 1930.

In making counters in the way just indicated the dieing out of the laminae gives rise to a quantity of small odd-shaped portions of scrap board and the skiving gives rise to a further quantity of scrap, as much as 40% of the board used being frequently wasted as scrap in this manner in dieing out and skiving taken together and sometimes even as much as 60% where blanks of a markedly asymmetrical shape are called for. In view of the fact that the cost of the sheets of board used generally forms a major part of the cost of a finished counter the circumstance that so large a percentage of the board used is wasted is responsible for an appreciable proportion of this latter cost.

It is one of the various objects of the present invention to provide an apparatus for making a shoe stiffener member blank of a desired outline in which little or no waste of material will take place.

One of the several features of the present invention is an apparatus for making a shoe stiffener member blank of a desired outline shape the apparatus being adapted for performing the steps of (a) imparting an appropriate outline shape to a readily flowable mass of aqueous pulp composition and (b) causing (or allowing) water to be lost from the shaped mass until a blank of the desired outline shape and of a board-like consistency is obtained. In the operation of the apparatus the mass of pulp composition not only has an appropriate outline shape imparted to it while it is in the readily flowable condition but also is shaped in thickness, preferably to provide a tapering marginal portion bordering a central portion of uniform thickness.

Apparatus for making a counter and its manner of operation are hereinafter described in detail, which apparatus is illustrative of the invention. In operation of this illustrative apparatus a readily flowable aqueous pulp composition comprising, for example, about 1% fibre (by weight) is first prepared. A measured quantity of the composition is poured into an outer mould member of the apparatus which has a retaining wall of the desired outline shape and a foraminous water-permeable floor, and water drained away, ordinarily with the assistance of a small degree of vacuum, to leave in the outer mould a pat, of uniform thickness, of composition comprising, preferably, about 7%–8% by weight of fibre, such pat being of a consistency such that it is stiff enough substantially to retain its shape if left standing on a flat surface, but is nevertheless readily flowable under slight pressure. The percentage of fibre may vary from this percentage range depending upon the kind of fibre employed. The outline shape of the pat is determined by the mould and is appropriate to a counter or other stiffening member.

An outer die constituting a further member of the apparatus is then pressed down upon the pat in the outer mould, the die having a lower work-engaging surface for applying pressure to selected areas of the pat, such as the marginal portion to cause material from the pressed areas to flow to other areas so that the pat is shaped in thickness to provide areas of greater thickness having more fibres per unit area and areas of less thickness having fewer fibres per unit area.

Next, a further die member of the apparatus is inserted into the outer die, the further die having a flat horizontal lower surface, and whole upper surface of the mass of pulp composition subjected to preliminary pressure. Preferably, the degree of vacuum applied is increased at this stage, suitably to about 25" of mercury.

The mass of composition is next subjected to heavy pressure in a hydraulic press, for example a pressure of about 30,000 lbs., for a few seconds, after which the pressure and vacuum are discontinued, the mould and dies dismantled and the workpiece removed. The workpiece now has the consistency of wet board being about 30% fibre by weight; it has, where the initial shaping pressure was applied to a marginal portion, a central portion which is of uniform thickness and more compacted than its marginal portions.

Following removal from the mould the workpiece may next be subjected to drying for a period but not so as to reduce the percentage of water in the workpiece to less than 65%. The workpiece may then be pressed between thin smooth sheets of cloth in moulds to reduce it substantially to the desired thickness for the finished stiffener blank and to expel surplus water until the fibre content is 48–50% by weight. The cloth also imparts a uniform surface finish.

Thereafter the workpiece is dried out to a uniform water content of from 5% to 14% by weight, to provide a stiffener blank which may be treated further. For example, a counter blank may be crimped, waxed, rolled and moulded in the usual way to provide a finished counter.

In a modification of the apparatus, rather than a single outer mould serving both for the production of a pat as aforesaid and for subsequently shaping the same in thickness, separate moulds are provided for these two purposes, i. e., a first, which is of a light construction only, in which the pat of composition is produced and a second, which is of relatively strong construction, in which the composition is subjected to pressure as aforesaid; by this means the latter, more expensive, mould is not occupied for as long a period.

In this modification, the apparatus will comprise a plurality of outer moulds of a light construction in which pats as aforesaid may be produced, means for conveying said pats from such moulds to an outer mould of relatively strong construction, and means for subjecting composition in said last mentioned mould to pressure.

As will be seen, in operation of the apparatus of the invention no pulp composition is wasted, but just sufficient is poured into the outer mould to make the counter blank. Further the apparatus forms a blank having a more compacted central portion bordered by less compacted marginal portions so that, after moulding, the resultant counter has a relatively hard central portion bordered by relatively less hard marginal portions as usually required by shoe manufacturers.

The above and other of the various objects and the several features of the present invention will become clear from the following more detailed description, to be read with reference to the accompanying drawings of the said illustrative apparatus; it will be realized that this illustrative apparatus has been selected for description by way of example rather than by way of limitation of the invention.

In the accompanying drawings:

Fig. 5 is a sectional elevational view of the outer mould taken along the line V—V of Fig. 3 showing material to be moulded therein;

Fig. 6 is a sectional elevational view through the outer mould and an outer die taken along a line corresponding to the line V—V of Fig. 3 and showing material to be moulded at an intermediate stage in operation of the moulding apparatus;

Fig. 7 is a sectional elevational view through the outer mould, outer die and inner die taken along a line corresponding to the line V—V of Fig. 3 and showing the material to be moulded at a further stage in operation of the moulding apparatus;

Fig. 8 is a sectional elevational view along the line V—V of Fig. 3 showing the outer mould, outer die and inner die with moulding material confined between the mould and dies.

Fig. 10 is a development showing, in a considerably exaggerated manner, how the thickness of the blank of Fig. 2 varies around the edge thereof; and Fig. 11 is a diagrammatic view showing a modified form of the apparatus.

A stock aqueous pulp composition for moulding in the apparatus is first prepared as follows: 75 gms. of dry kraft fibre board is cut into squares of about ½″ side and beaten in a beater with 25 gms. of cotton fibre and 4500 ccs. of water for 1¾ hours to obtain an aqueous pulp composition of uniform consistency and pH between 7 and 8. 4 gms. of wood rosin, in the form of an emulsion of rosin in a little water made alkaline with soda, is then added and beating continued for a further ½ hour after which about 3 gms. of dry powdered sodium aluminate is added, preferably enough to bring the pH to about 9. An amount of lignin equal to the amount of rosin may also be added if desired or other additives such as synthetic resins, but all such additions will increase the cost of the final counter and are preferably omitted. After a further 15 to 20 minutes 3 gms. of dry powdered aluminum sulphate are added to reduce the pH to about 5 and precipitate the rosin upon the fibre, precipitated alumina perhaps assisting in effective association of the rosin with the fibre. The whole is then beaten for about another ¼ hour.

650 cc. of this stock composition are diluted to 1400 cc. with water at a pH of about 5 to obtain an aqueous pulp composition of which the fibre constitutes about 1% by weight.

Figure 4:
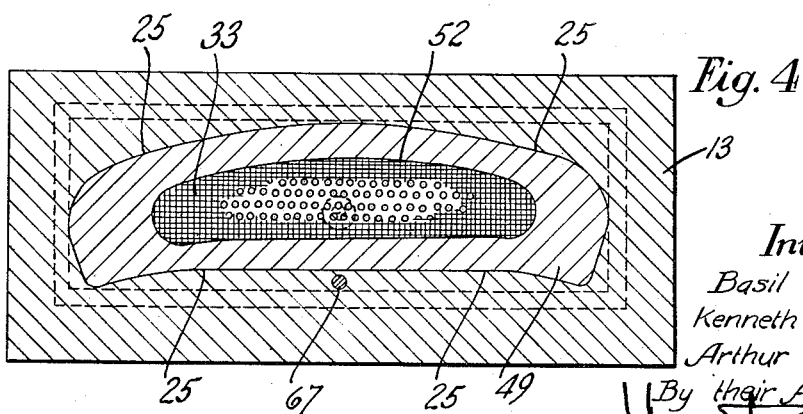
Fig. 4 is a sectional view along the line IV—IV of Fig. 3 with parts broken away.
Figure 5:
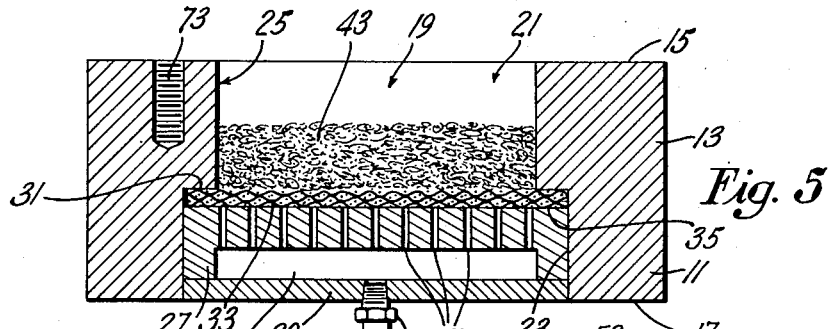
Figs. 5, 6, 7 and 8 show consecutive stages in operation of the illustrative apparatus.

This 1400 cc. is poured into an outer mould shown at 11 in Figures 3, 4, 5, 6, 7 and 8. Referring now to Figures 4 and 5, the mould 11 comprises a rectangular block 13 of metal which has a flat horizontal upper face 15 and a flat bottom face 17. A passage 19 extends through the block 13 from top to bottom, an upper part 21 of which is smaller than a lower part 23, the upper part 21 having a vertical wall 25 and, as shown in Figure 4, being of a shape in horizontal cross-section appropriate to the outline shape of a counter blank. Obstructing the lower part 23 of the passage 19 is a block 27 held in place by a coverplate 29, while resting upon the block 27, and gripped between the later and a shoulder 31 (which latter occurs at the junction of the parts 21, 23 of the passage 19) are three sheets of fine wire gauze 33 which constitute a permeable floor to the mould 11. The block 27 has a flat horizontal upper surface 35 into which open a large number of ports 37, the latter communicating with a chamber 39 formed between the block 27 and the coverplate 29. Opening into the chamber 39 is a pipe 41 which is connected to a source of vacuum (not shown), the degree of vacuum given by which may be adjusted.

The 1400 cc. of aqueous pulp composition made as referred to are poured slowly into the mould 11, a small degree of vacuum, for example 5″ of mercury, being maintained in the chamber 39, and the aqueous part of the composition largely passes through the gauzes 33, leaving upon the latter a pat 43 of aqueous pulp composition, of a uniform thickness of about ½″, comprising about 7–8% by weight of fibre. The pat 43 is of a consistency such that it would substantially retain its shape if left standing on a flat surface (not surrounded by a vertical wall such as 25) but is nevertheless readily flowable under slight pressure. The outline shape of the pat 43 corresponds to the cross-sectional shape of the part 21 of the passage 19 and is appropriate to a counter blank.

Figure 2:
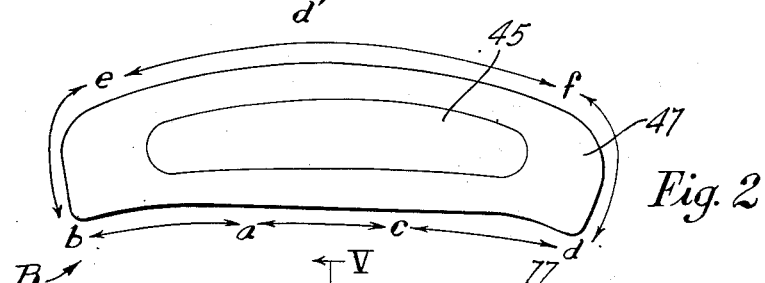
Fig. 2 is a plan view of a stiffener blank from which the counter of Fig. 1 may be made by waxing, rolling and then moulding in a machine of the type shown in Patent No. 1,742,300.
Figure 3:
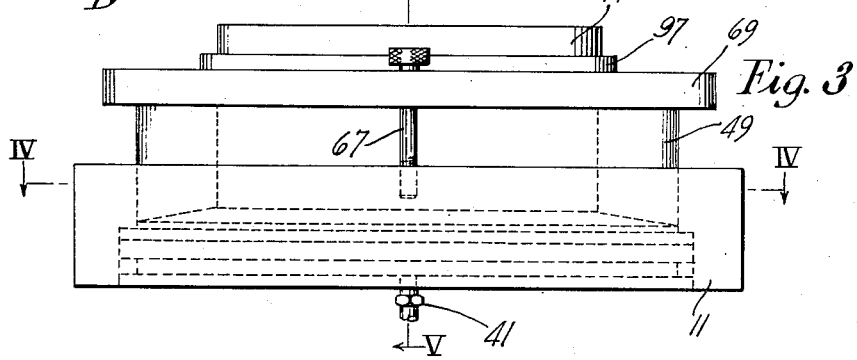
Fig. 3 is a side elevational view of an outer mould and inner and outer dies of the illustrative apparatus.

In the preparation of a counter blank, a blank B of the shape indicated in Figures 2 and 10 is produced from the pat 43 in a manner to be described.

The blank B has an outline shape appropriate to a counter blank and is of a board-like consistency. It has a central portion 45 of a uniform thickness of about .070″ bounded by a tapering marginal portion 47; however, the portion 47 does not taper uniformly all around the portion 45 since the edge of the blank B varies somewhat in thickness from place to place therealong. Thus, referring to Figure 2, the parts of the edge from a to b and from c to d are of greatest thickness, about .025″, the parts from b to e and d to f are about .014″ thick and the part from e to f about .010″ thick, the part from a to c being about .020″ thick. No sudden changes of edge thickness occur at a, b, c, d, e, or f but the thickness should be understood as changing gradually at or about these localities.

Returning now to Figure 5, after the pat 43 has been produced an outer die 49 (Figure 6) is inserted into the passage 19 and pressed down upon the pat 43, the degree of vacuum in the chamber 39 at the same time being increased to about 10″ of mercury.

The die 49 fits snugly within the part 21 of the passage 19 and itself has a vertical central passage 51 therethrough (with a vertical wall 52) corresponding in horizontal cross-section to the portion 45 of the blank B. The die 49 has a flat horizontal upper surface 53, but its lower, work-engaging surface 55 is annular and slopes downwards and outwards from a ridge 57 formed where the passage 51 opens into the surface 55. The ridge 57 lies all in one horizontal plane, but the surface 55 slopes downwards and outwards from the ridge 57 to an outer edge 59 which does not lie all in one plane but runs up and down in a manner which will be described hereinafter.

The die 49 is pressed down into the passage 51 to a limit determined by a stop piece 61 inserted between the face 15 and a projecting flange 69 of the die 49, the die 49 being then so positioned that the edge 59, where it is nearest to the top one of the gauzes 33, is distant about ⅜₂″ therefrom. As the die 49 is pressed down in this manner material of the pat 43 is shaped in thickness to provide a tapering marginal portion and part is forced inwards and upwards to form a short column 63 and an annular projection shown at 65 within the passage 51. A screw 67 is now inserted through a bore 71 in the flange 69 and threaded into a tapped hole 73 in the mould 11, a head 75 of the screw 67 thereupon holding the die 49 down upon the mould 11.

Figure 7:
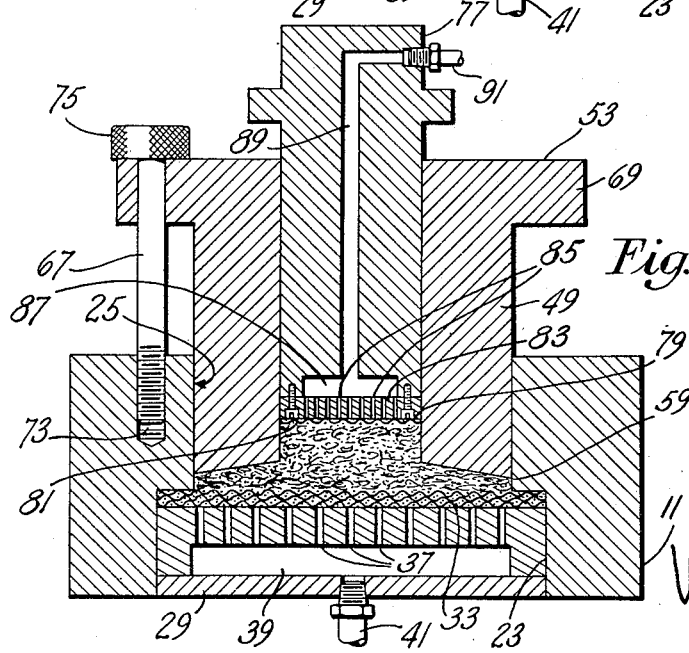

Next, referring to Figure 7, an inner die 77 is inserted into the passage 51 and pressed down upon the pulp composition, the degree of vacuum in the chamber 39 at the same time being increased somewhat. The stop piece 61 is now removed.

The die 77 fits snugly within the passage 51 and has a flat horizontal lower surface 79 provided by a sheet of metal gauze 81. The gauze 81 is backed by a perforated metal plate 83, perforations 85 running through the plate 83 and making communication between the gauze 81 and a chamber 87 within the die 77. A passage 89 within the die 77 provides communication between the chamber 87 and a pipe 91, which latter is connected to the source of vacuum.

The die 77 is pressed down upon the pulp composition to the position shown in Figure 7, upward movement of the die 49 consequent upon increased pressure upon the composition being prevented by the screw head 75. As the die 77 is pressed down the degree of vacuum in the chambers 39, 87 is increased to about 25″ of mercury.

Figure 8:
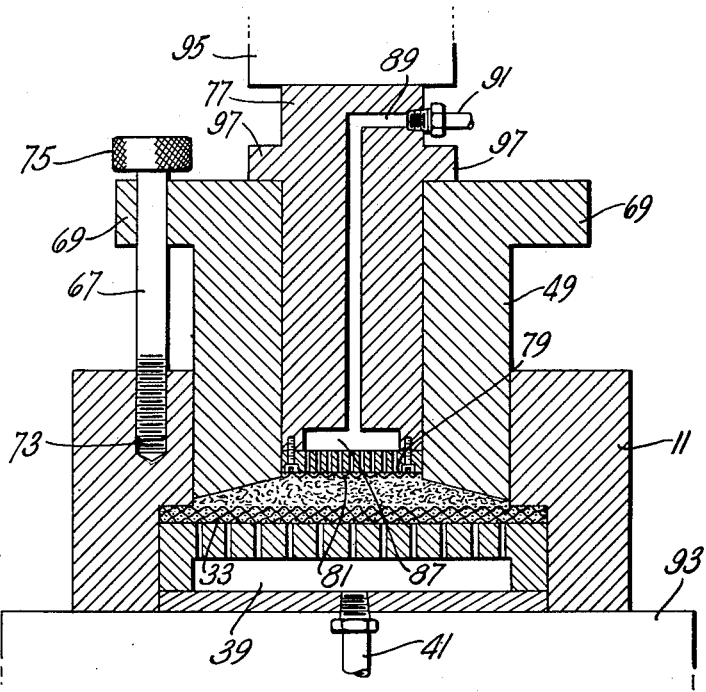
Figure 9:
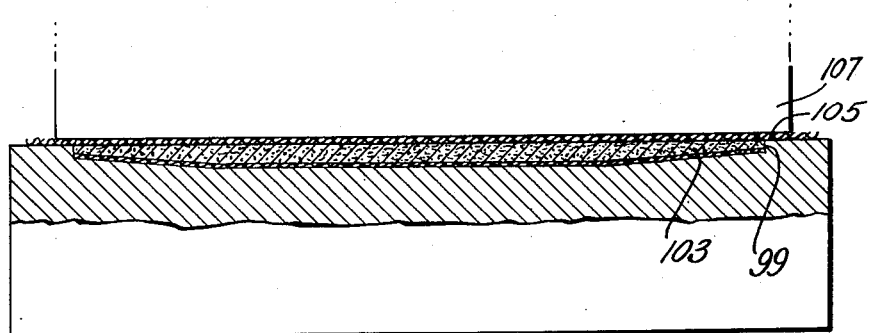
Fig. 9 is a sectional elevational view of finishing moulds used with moulded material therein at a later stage than that of Fig. 8 in operation of the illustrative moulding apparatus.

As a next step, see Figure 8, the mould 11 is stood upon a lower platen 93 of a press and an upper platen 95 of the press brought down to apply pressure to the die 77, a pressure of about 30,000 lb. being applied for about 5 seconds. The die 77 is provided with a projecting flange 97 which is positioned to engage the die 49 when the lower surface 79 of the die 77 is level with the ridge 57 upon the die 49, and as a result the pressure applied first forces the die 77 down until the surface 79 is level with the ridge 57 and thereafter the two dies 49, 77 are forced down together, a small clearance appearing between the screw head 75 and the flange 69. If desired the flange 97 may be so positioned upon the die 77 that the lower surface 79 of the latter is somewhat lower than the ridge 57 (for example 1/16″) when the flange 97 engages the die 49. Engagement of the surface 79 with the composition shapes the latter to provide a central portion of uniform thickness.

As a result of the pressure applied the composition in the mould 11 is compressed until the surface 79 is distant from the floor of the mould 11, i. e. from the upper surface of the gauzes 33, about 7/32″ or slightly less. The character of the edge 59 is such that its distance from the floor of the mould 11, with the die 49 as now positioned, varies in the same general manner as the thickness of the edge of the blank B, but is approximately three times said edge thickness at corresponding points. Thus where the edge 59 is nearest to the floor of the mould 11 it is distant about .030″ therefrom (this will be along a part of the edge 59 corresponding to the part e to f of the edge of the blank B) and where the edge 59 is furthest from the floor of the mould 11 it is distant therefrom about .075″ (this will be along parts of the edge 59 corresponding to parts a to b and c to d of the edge of the blank B). Other parts of the edge 59 are distant about .042″ from the floor of the mould 11 (corresponding to parts of the edge of the blank B from b to e and d to f) and another part is distant about .060″ therefrom. It will be appreciated, therefore, that the mass of composition as shown in the mould in Figure 8 has the same (or substantially the same) outline shape as the blank B but it is about three times as thick as the blank B at corresponding points. It will also be noted that the surface 55 does not slope at the same angle as the portion 47 but rather slopes about three times as sharply at corresponding localities.

The pressure of the press is then relieved and the mould 11 and dies 49, 77 removed from between the platens 93, 95. The source of vacuum is then disconnected from the pipe 41, but not from the pipe 91, the screw 67 removed and the dies 49, 77 removed from within the mould 11 with the mass of composition adhering thereto. The source of vacuum is then disconnected from the pipe 91 and the mass of composition, which is now a coherent self-sustaining entity, stripped off; it has the consistency of wet board and while not readily flowable may yet be readily shaped by pressure. The water content of the mass of composition is about 70% by weight.

Figure 6:
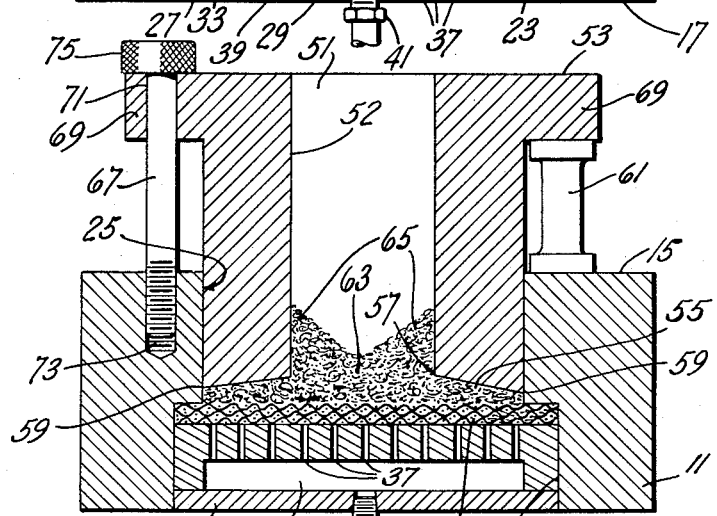

The central portion of the mass is more compacted than the marginal portion, due to the fact that the column 63 and projection 65 have been pressed down, in proceeding from the stage of Figure 6 to that of Figure 8, more than other parts of the mass, which latter is not so flowable as to allow complete balancing out of pressure therein.

The workpiece may now be dried a little, if desired, for example by hot air, but not so as to reduce the water content to less than 65% by weight. It is then placed in an inverted position within a cavity 99 of a lower mould 101, the cavity 99 being lined with a sheet of smooth cloth 103 and corresponding in shape to the blank B both as regards outline and thickness. The workpiece is covered with another sheet of smooth cloth 105 and the latter engaged by an upper mould 107 which has a flat lower surface, the two moulds 101, 107 being pressed together between the platens 93, 95 with a pressure of about 25,000 lbs. for about 1 minute, during which time further water is extracted and the thickness of the workpiece reduced. The workpiece, on removal from between the sheets of cloth 103, 105, now has substantially the outline shape and thickness dimensions required for the blank B as hereinbefore described, or may be very slightly thicker, e. g. 5–10%, but its water content is still 50–52% by weight. The cloth imparts to it a uniform surface finish and assist in extraction of the water.

The workpiece is next dried out to a uniform water content of from 5% to 14% by weight by use of hot air and then constitutes the blank B.

Figure 1:
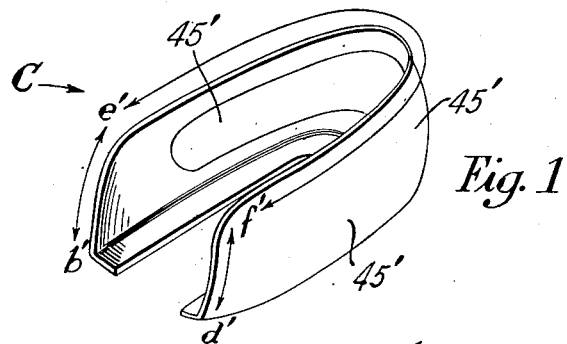
Fig. 1 is an angular view showing a counter made in the said illustrative apparatus.

The blank B may be crimped, waxed, rolled and moulded in the usual way to provide a finished counter C, shown in Figure 1, having a part 45′ of substantially uniform thickness and somewhat more compacted than other parts of the counter, the part 45′ corresponding to the portion 45 of the blank B. The counter C has a relatively thin edge from e′ to f′ (corresponding to the edge from e to f of the blank B) as usually called for by shoe manufacturers and also from e′ to b′ and f′ to d′ while around the heelseat the edge thickness of the counter is rather greater.

In a modified form of the illustrative apparatus (Figure 11) rather than including a single mould 11 both for the production of the pat 43 and for subsequently shaping the same in thickness, the apparatus comprises a number of light sheet metal moulds 109 for forming pats 43′.

The moulds 109 are open at top and bottom and are mounted on a suitable endless chain 111 which is driven round step by step in the direction of the arrow P. Beneath the chain 111 is arranged a second endless belt 113 of fine wire gauze which is driven around, in synchronism with the belt 113 in the direction of the arrow Q. The arrangement is such that three of the moulds 109 upon a lower run of the chain 111 stand upon the belt 113 as shown in Figure 11 and are moved along with the latter. The belt 113 is supported at this locality upon a flat upper surface of a supporting block 115 corresponding to the block 27; the block 115 has ports therein which communicate with a chamber (corresponding to the chamber 39) which in turn communicates with the source of vacuum via a pipe 117.

As the apparatus operates moulds 109 will proceed step by step from right to left along the block 115, there normally being three thereover as shown. As soon as one of the moulds 109 arrives over the block 115 at the right hand end thereof it is filled with 1400 ccs. of the 1% aqueous pulp composition, and water drains therefrom as that mould moves along from right to left until when the mould arrives at the left hand end of the block 115 it contains a self sustaining pat 43′. As will be seen from Figure 11 the moulds 109 do not have vertical walls but walls which slope inwards and upwards, whereby the pat 43′ is to some extent preshaped in thickness.

At the left hand end of the block 115 each mould 109 is in turn lifted from its pat 43′, which latter remains upon the belt 113 and passes step by step to moulding means shown at M. The means M comprises an outer mould 11′ and outer and inner dies 49′, 77′ arranged in a similar manner to the parts referred to as 11, 49, 77 hereinbefore, and cooperates with a perforated supporting block 119 having a flat upper surface lying beneath the belt 113, the block having an internal chamber from which ports lead to its upper surface and which is connected by a pipe 121 to the source of vacuum.

The mould 11′ is brought down around the pat 43′ upon the belt 113, and thereafter the outer die 49′ and inner die 77′ brought down in turn by suitably arranged power-operated means to subject the pat 43′ to pressure, after which the means M is lifted as a whole, and the workpiece passes on for subsequent treatment by moulding means such as the moulds referred to as 101, 107 hereinbefore.

Although the invention has been hereinbefore described with reference to apparatus for the production of the flat blank B from aqueous pulp composition followed by subsequent moulding of the latter in a counter moulding machine of the Stewart type, yet it is contemplated as being within the scope of the invention to provide apparatus for forming a blank shaped like the counter C, i. e. of a hollow three dimensional shape from aqueous pulp composition by provision of suitably shaped moulding means.

Having thus described our invention, what we claim as new and desire to secure by Letters Patent of the United States is:

1. In apparatus for making a shoe stiffener blank of desired outline shape and varied thickness, the combination of a foraminous surface, a retaining wall for confining of said surface a layer of a flowable suspension of fibrous material, a first presser member extending along the marginal portions of said retaining wall and having inwardly and upwardly extending pressure surfaces, the inner edges of said presser member defining a central passage, said first presser member being movable to press the marginal portions of said suspension of fibrous material to cause flow of a portion of said suspension from said marginal portions to the central passage and to prevent substantial return of said portion of the suspension to said marginal portions, a second presser member fitting within said central passage and being movable after the pressing movement of said first presser member to force down the suspension of fibrous material in said passage, and means for withdrawing liquid from said fibrous suspension through said foraminous surface to form a layer of fibrous material wherein the central portions have a greater quantity of fibers per unit area than the marginal portions and the quantity of fibers per unit area of the marginal portions progressively decreases toward the edge.

2. In apparatus for making a shoe stiffener blank of desired outline shape and varied thickness, the combination of a foraminous plane surface, an inwardly and upwardly sloping wall for confining on said surface a layer of a flowable suspension of fibrous material, means for withdrawing liquid from said suspension of fibrous material through said foraminous surface, means for removing said wall from said surface, a retaining wall adapted to surround the fibrous residue on said surface and defining an area around said fibrous residue corresponding to the desired outline shape, a first presser member extending along the marginal portions of said retaining wall and having inwardly and upwardly extending pressure surfaces, the inner edges of said first presser member defining a central passage, said first presser member being movable to press the marginal portions of said fibrous residue and cause fibrous residue to flow from said marginal portions to the central passage and and to prevent substantial return of fibrous residue to said marginal portions, a second presser member fitting within said central passage and being movable after the pressing movement of said first presser member to force down fibrous residue in the central passage, and means for withdrawing liquid from said fibrous residue through said foraminous surface to form a layer of fibrous material wherein the central portions have a greater quantity of fibers per unit area than the marginal portions and the quantity of fibers per unit area of the marginal portions progressively decreases toward the edge.

References Cited in the file of this patent

UNITED STATES PATENTS

| Number | Name | Date |
|---|---|---|
| 123,985 | Ely | Feb. 27, 1872 |
| 237,626 | Stevens et al. | Feb. 8, 1881 |
| 513,017 | Howard | Jan. 16, 1894 |
| 973,280 | Knight | Oct. 18, 1910 |
| 982,925 | Barhoff | Jan. 31, 1911 |
| 1,474,860 | Talbot | Nov. 20, 1923 |
| 1,780,623 | Loetscher | Nov. 4, 1930 |
| 1,873,585 | Harvey | Aug. 23, 1932 |
| 2,017,496 | Hawley | Oct. 15, 1935 |
| 2,159,638 | Schur | May 23, 1939 |
| 2,183,965 | Ledeboer | Dec. 19, 1939 |
| 2,212,580 | Ayers | Aug. 27, 1940 |
| 2,515,113 | Chaplin | July 11, 1950 |